United States Patent [19]

Aoki et al.

[11] Patent Number: 4,879,503
[45] Date of Patent: Nov. 7, 1989

[54] BLOWER MOTOR CONTROL FOR AN AIR CONDITIONER

[75] Inventors: Hideki Aoki; Mitsuru Murata; Hirotaka Sakamoto, all of Shizuoka, Japan

[73] Assignee: Mitsubishi Denki Kabushiki Kaihsa, Tokyo, Japan

[21] Appl. No.: 235,480

[22] Filed: Aug. 24, 1988

[30] Foreign Application Priority Data

Aug. 24, 1987 [JP] Japan .................................. 62-209861

[51] Int. Cl.$^4$ ............................................. H20P 5/40
[52] U.S. Cl. ...................................... 318/809; 318/779
[58] Field of Search ................ 318/809, 778, 779, 729

[56] References Cited

U.S. PATENT DOCUMENTS 4,581,568 4/1986 Fitzpatrick et al. ................ 318/729
4,584,507 4/1986 Taylor .............................. 318/345 E Primary Examiner—David Smith, Jr.
Attorney, Agent, or Firm—Oblon, Spivak, McClelland, Maier & Neustadt

[57] ABSTRACT

A blower motor control for an air conditioner is carried out so that when a detected actual rotation speed has come into an allowable deviation range to a target rotation speed at the time of controlling the motor so as to approach its rotation speed to the target rotation speed, the output for adjusting the rotation speed is not changed. As a result, a stable rotation speed can be obtained as long as the load on the motor does not fluctuate. Furthermore, after the output has been fixed, the allowable deviation range is expanded to prevent the output from changing even if slight load fluctuation is caused. This allows stable controls.

6 Claims, 3 Drawing Sheets

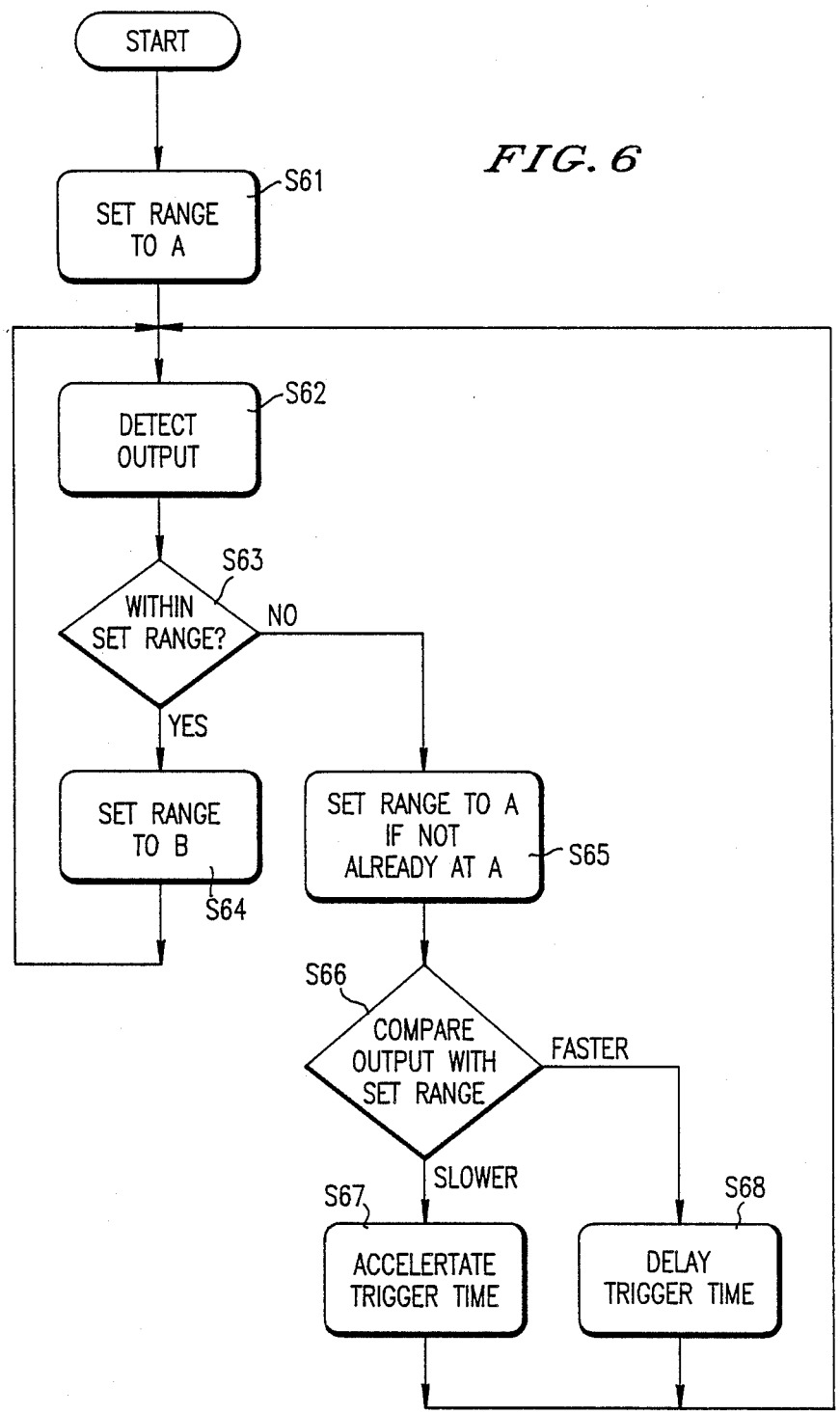

BLOWER MOTOR CONTROL FOR AN AIR CONDITIONER

SUMMARY OF THE INVENTION

The present invention relates to an air conditioner which is controlled by a micro computer. More particularly, it relates to a rotation speed control for an electric motor in the air conditioner, which is used to drive a blower.

FIG. 2 is a block diagram illustrating the arrangement in a circuit of a closed-loop control system with a micro computer incorporated in it. Reference numeral 3 desiganates an ac electric motor for driving a blower. Reference numeral 1 designates an ac power source. Reference numeral 2 designates a triac element as phase-shift means, which controls a voltage applied to the motor 3. Reference numeral 9 designates a gate for the triac element 2. Reference numeral 4 designates a detection circuit as rotation speed detecting means for detecting a rotation speed of the motor 3. Reference numeral 10 designates a zero cross timing detection circuit a zero cross timing detecting means for detecting zero cross timing. Reference numeral 11 designates a micro computer for controlling the triac element 2.

A conventional control by the micro computer will be described in reference to FIGS. 3 and 4. FIG. 3 illustrates the phase control output by the triac. FIG. 3(a) illustrates the timing chart of the ac power source. Figure 3(b) illustrates the timing chart of trigger pulses which are supplied to the gate of the triac. When a trigger pulse is supplied to the gate of the triac, the triac is fired into conduction to provide power for the motor. When the current goes to zero, the triac comes into its off state. The timing when the trigger pulse is supplied can be shifted to change the supplied power to the motor, thereby controlling the rotation speed of the motor.

FIG. 4 illustrates a flow chart of an conventional micro computer control, wherein the rotation speed of the motor is brought closer to a target rotation speed. At a step S1, the rotation speed is detected. At the next step S2, it is found whether the detected speed is equal to the target rotation speed or not. When equal, the micro computer prepares for the next rotation speed detection without changing the conduction angle. When not equal, the processing proceeds to a step S3. At the step S3, the detected rotation speed is compared to the target rotation speed. When the detected rotation speed is slower than the target rotation speed, the trigger timing for applying the trigger pulse to the gate of the triac is accelerated by one step at a step S4. On the other hand, when the detected rotation speed is faster than the target rotation speed, the trigger timing is delayed by one step at a step S5. Such process is repeated to control the rotation of the motor so as to approach the rotation speed of the motor to the target rotation speed. The shift width of the one step of the trigger timing is determined depending on the processing capability and speed of the micro computer, including its process other than described above. The generating timing of the trigger pulse which is output from the micro computer to the gate of the triac is basically not an analogue output but a quantized stepped output.

In accordance with the conventional control as stated above, as long as the detected rotation speed is not equal to the target rotation speed, the process wherein the trigger timing is accelerated by one step and the process wherein the trigger timing is delayed by one step are repeated as shown in FIG. 5 even if the load on the motor is constant. As a result, the rotation speed of the motor is always fluctuating, raising problems wherein vibration and noise are produced.

It is an object of the present invention to eliminate the disadvantages of the conventional control and to provide a new and improved blower motor control for an air conditioner, capable of stabilizing the rotation speed of the motor near to a target rotation speed to eliminate the vibration and noise, and of adjusting the trigger timing so as to bring the actual rotation speed closer to the target rotation speed to minimize the vibration and noise when the rotation speed is changed due to load variation beyond a certain value.

The foregoing and the other objects of the present invention have been attained by providing a blower motor control for an air conditioner, wherein when the actual rotation speed of the motor is brought closer to a target rotation speed, an allowable deviation range is set in respect to the target rotation speed; as long as the actual rotation speed has come into the allowable deviation range, the gate trigger timing to a triac as phase-shift means is fixed; when the gate trigger timing is fixed, the control for bringing the rotation speed varied due to load variation on the motor closer to the target rotation speed is not carried out; and at that time a new allowable deviation range is set so as to be wider than the allowable deviation range that has been used at the time of carrying out the control for bringing the actual rotation speed closer to the target rotation speed. In accordance with the present invention, when the detected actual rotation speed has come into the allowable deviation range to the target rotation speed at the time of controlling the motor so as to approach its rotation speed to the target rotation speed, the output for adjusting the rotation speed is not changed. As a result, a stable rotation speed can be obtained as long as the load on the motor does not fluctuate. Furthermore, after the output has been fixed, the allowable deviation range is expanded to prevent the output from changing even if slight load fluctuation is caused. This allows stable controls.

The control according to the present invention can change the allowable deviation range so as to avoid unnecessarily modification to the actual rotation speed, minimizing the number of switching from the process wherein the trigger timing is accelerated by one step to the process wherein the trigger timing is delayed by one step or vice versa. As a result, the present invention offers advantages in that the vibration and the noise caused at such switching can be remarkably reduced.

BRIEF DESCRIPTION OF THE DRAWINGS

FIG. 6 is a flow chart of the functioning of this invention.

FIG. 1 is a block diagram illustrating the whole arrangement of an embodiment of a motor control for an air conditioner blower according to the present invention. In the embodiment, an ac electric motor 3 for driving an air circulating blower is provided with a rotation detector 4. There is provided rotation speed detecting means 5, into which a detection signal is input from the rotation detector 4, detects an actual rotation speed of the motor 3. There is also provided output determining means 6 which compares the detected rotation speed with a target rotation speed of the motor based on the output from the rotation speed detecting means 5 to determine a conduction angle. There is also provided zero cross timing detecting means 7 which detects zero cross timing of an ac power source 1 for energizing the motor 3. There is also provided phase control output means 8 for controlling gate trigger timing to a triac 2 as phase shifting means. Based on the output from the output determining means 6 and the output from the zero cross timing detecting means 7, the phase control output means 8 controls the gate trigger timing in each half-cycle.

Figure 1:
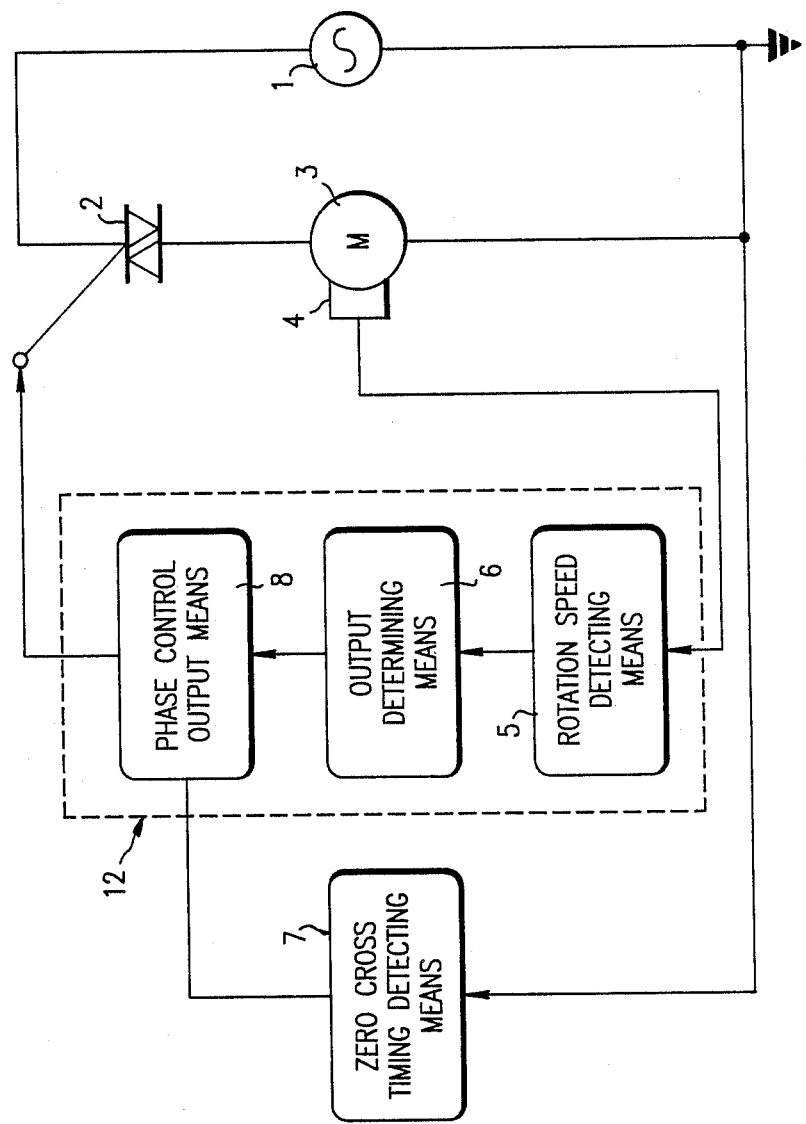
FIG. 1 is a block diagram illustrating the whole arrangement of an embodiment according to the present invention.
Figure 2:
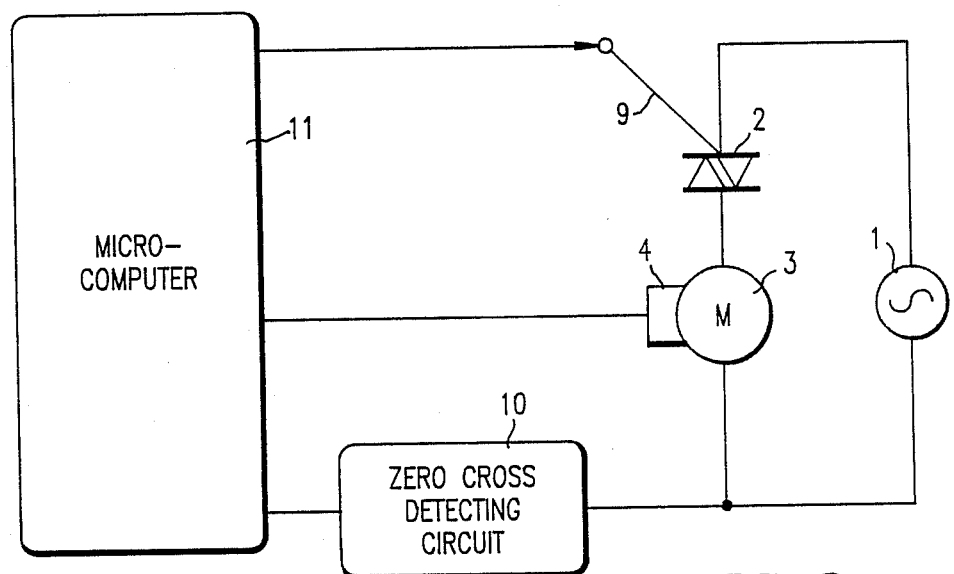
FIG. 2 is a block diagram illustrating circuitry wherein a micro computer is incorporated in a closed-loop control system of the embodiment.
Figure 3:
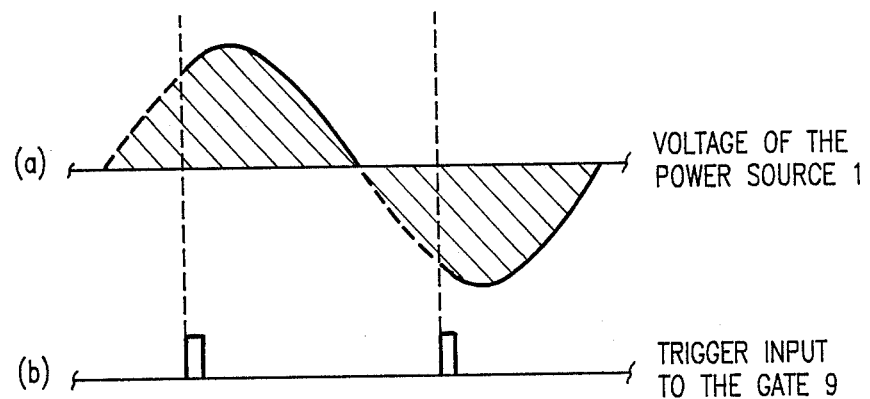
FIG. 3 is a diagram illustrating the phase control by a triac.
Figure 4:
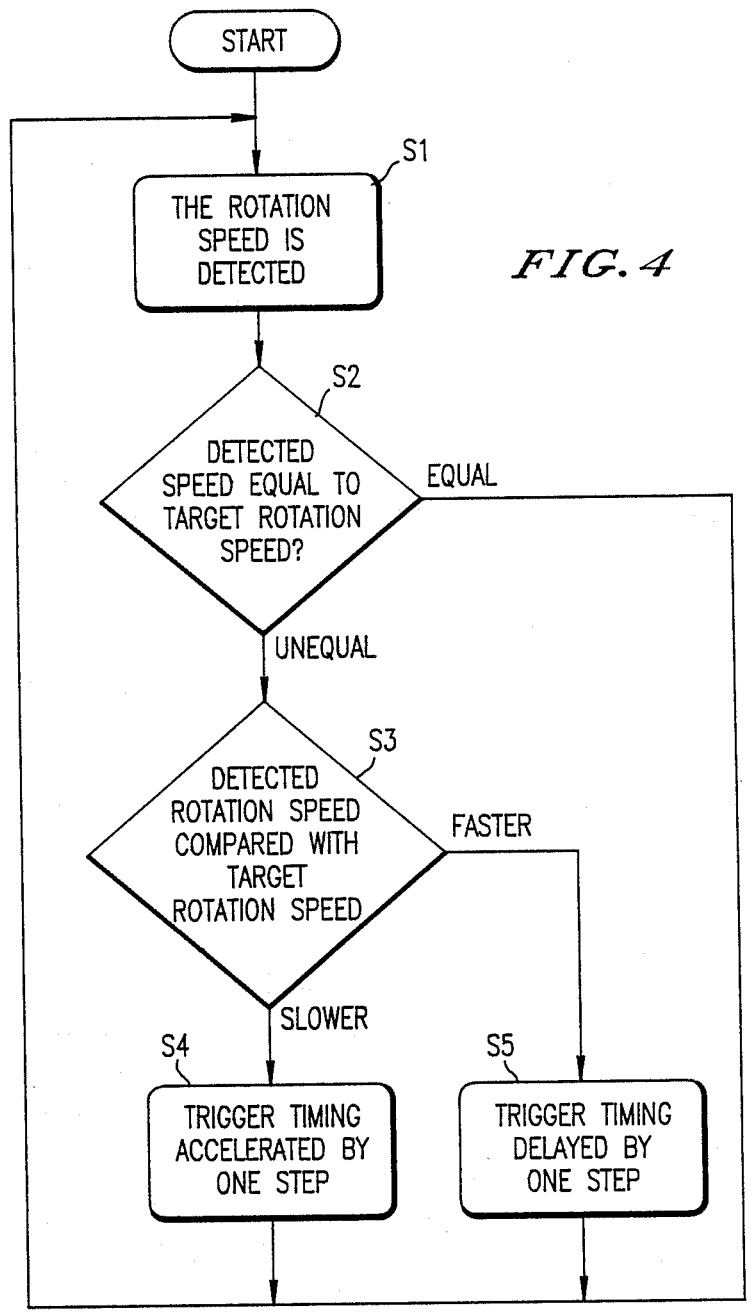
FIG. 4 is a flow chart of a conventional micro computer control.
Figure 5:
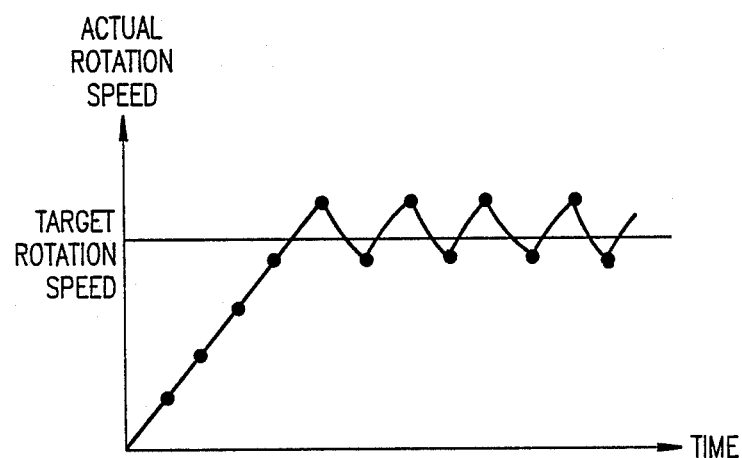
FIG. 5 is a diagram showing how the conventional micro computer controls the rotation speed.

As a result, the voltage of the ac power source 1 which provides power to the ac motor 3 is detected its conduction angle to the triac in each half-cycle of the power source to change the voltage applied to the motor 3, thereby adjusting the rotation speed of the motor. The conduction angle, of which the phase control output means 8 is informed, is determined by the output determining means 6 which determines a quantized stepped conduction angle so as to bring the detected actual rotation speed closer to the target rotation speed based on the target rotation speed as preset and the actual rotation speed detected by the rotation speed detecting means 5S62. When the rotation speed as the output from the rotation speed detecting means 5 is not within a preset allowable deviation range (A) centered with respect to the target rotation speed S65, conduction angle determining means (not shown) in the output determining means 6 sets a new conduction angle for bringing the actual rotation speed of the motor 3 closer to the target rotation speed, which is output to the phase control output means 8S67, S68. On the other hand, when the actual rotation speed as the output from the rotation speed detecting means 5 is within the preset allowable deviation range (A) centered with respect to the target rotation speed, the conduction angle determining means sets the same conduction angle as the previous one without changing the conduction angle, which is output to the phase control output means 8S65.

At the same time, the output determining means 6 challenges the allowable deviation ranged centered with respect to the target rotation speed to a new allowable deviation range (B) S64 which is wider than the range (A).

After the allowable deviation range has changed to the wider range (B), when the rotation speed as the output from the rotation speed detecting means 5 is within the new allowable deviation range (B) centered with respect to the target rotation speed, the conduction angle determining means in the output determining means 6 sets the same conduction angle as the previous one, which is output to the phase control output means 8.

On the other hand, when the rotation speed as the output from the rotation speed detecting means 5 is not within the range (B) centered with the target rotation speed, the conduction angle determining means sets a new conduction angle for bringing the actual rotation speed closer to the target rotation speed, which is output to the phase control output means 8. At the same time, the output determining means 6 changes the allowable deviation range centered with the traget rotation speed from the range (B) S65 to the range (A) which is narrower than the range (B).

As stated above, when the actual rotation speed of the motor 3 is already closer to the target rotation speed, i.e. within the range (A), the actual rotation speed is maintained and the conduction angle is not changed until the actual rotation speed changes in such manner as to be away from the target rotation speed in the whole width, i.e. to reach the limit of the range (B). After the rotation speed of the motor 3 has become once closer to the target value, when the rotation speed of the motor is changing in such direction that the rotation speed of the motor 3 goes out of the range (B), i.e. in such direciton that the rotation speed goes away from the target rotation speed than before, the allowable deviation range is returned from the range (B) to the range (A) which is narrower than the range (B), thereby bringing the actual rotation speed of the motor closer to the target rotation speed more quickly. As a result, the number of the rotation speed changes which are caused by modifying the rotation speed of the motor 3 depending on the load fluctuation on the motor is reduced, remarkably minimizing the vibration and the noise.

The controls by the output determining means 6 can be carried out by use of a micro computer 12. Besides the output determining means 6, the controls by the rotation speed detecting means 5, the zero cross timing detecting means 7 and the phase control output means 8 can be carried out by the micro computer 12.

We claim:

1. A blower motor control for an air conditioner, said air conditioner including an ac motor for driving an air circulating blower comprising:

rotation speed detecting means for detecting a rotation speed of the motor;

a means for supplying AC power to the motor;

zero cross timing detecting means for detecting zero cross timing of the power source voltage;

phase shifting means for shifting the phase of the voltage supplied to the motor;

output determining means for comparing the rotation speed detected by the rotation speed detecting means to a set target rotation speed to determine a conduction angle for the motor;

phase control output means for controlling the phase shifting means based on the conduction angle determined by the output determining means and the output from the zero cross timing detection means; and means for outputting the rotation speed from the rotation speed detecting means when the detected speed is not within a present allowable deviation range (A) which is centered with respect to the target rotation speed, and for resetting the output determining means to a new conduction angle for bringing the actual rotation speed closer to the target rotation speed and for outputting the new conduction angle to the phase control output means; and further for, when the actual rotation speed is within the range (A), outputting from the determining means the same conduction angle as the previous one and for changing the allowable deviation range centered with respect to the target rotation speed in the output determining means from the range (A) to a new allowable deviation range (B) which is wider than the range (A) and yet further for when the rotation speed detected by the rotation speed detecting means is within the range (B) for outputting the same angle as the previous one to the phase control output means; and for after the allowable deviation range has changed from the range (A) to the range (B), when the actual rotation speed is not within the range (B), for causing the output determining means to set a new conduction angle for bringing the actual rotation speed closer to the target rotation speed and for outputting the new conduction angle to the phase control output means, and for centering the allowable deviation range with the target rotation speed in the output determining means from the range (B) to the range (A) which is narrower than the range (B).

2. A blower motor control according to claim 1, wherein the controls by the output determining means are carried out by a micro computer.

3. A blower motor control according to claim 2, wherein the controls by the phase control output means, the output determining means and the rotation speed detecting means are carried out by a micro computer.

4. A blower motor control according to claim 1, wherein the phase shifting means is controlled by the output from the zero cross timing detecting means in each half-cycle of the power source voltage.

5. A blower motor control according to claim 2, wherein the phase shifting means is controlled by the output from the zero cross timing detecting means in each half-cycle of the power source voltage.

6. A blower motor control according to claim 3, wherein the phase shifting means is controlled by the output from the zero cross timing detecting means in each half-cycle of the power source voltage.

* * * * *

UNITED STATES PATENT AND TRADEMARK OFFICE
CERTIFICATE OF CORRECTION

PATENT NO. : 4,879,503
DATED : Nov. 07, 1989
INVENTOR(S) : Hideki Aoki, et al

It is certified that error appears in the above-identified patent and that said Letters Patent is hereby corrected as shown below:

Title page:

The Assignee is incorrectly recorded, should be:

--Mitsubishi Denki Kabushiki Kaisha--

Signed and Sealed this

First Day of January, 1991

*Attest:*

HARRY F. MANBECK, JR.

*Attesting Officer*      *Commissioner of Patents and Trademarks*